J. A. JUST, DEC'D.
A. L. JUST & B. STOLZ, EXECUTORS.
FIBROUS DESICCATED MILK.
APPLICATION FILED SEPT. 4, 1907.
939,139.
Patented Nov. 2, 1909.
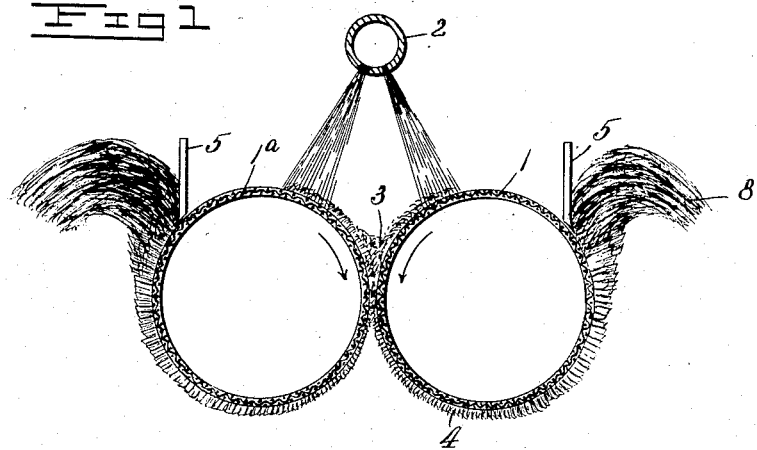
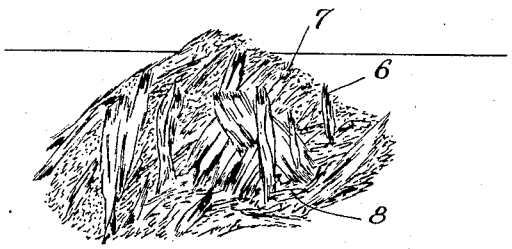
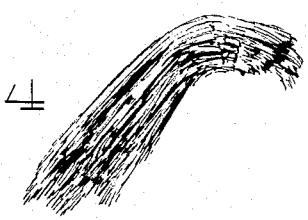
Inventor
John A. Just,
By K. P. McElroy
Associate Attorney
Witnesses
H. A. Robinette
G. M. Houghton

UNITED STATES PATENT OFFICE.

JOHN A. JUST, OF SYRACUSE, NEW YORK; ANNIE L. JUST AND BENJAMIN STOLZ EXECUTORS OF SAID JOHN A. JUST, DECEASED.

FIBROUS DESICCATED MILK.

939,139.  Specification of Letters Patent.  Patented Nov. 2, 1909.

Application filed September 4, 1907. Serial No. 391,375.

*To all whom it may concern:*

Be it known that I, JOHN A. JUST, a citizen of the United States, and a resident of Syracuse, in the county of Onondago and State of New York, have invented certain new and useful Improvements in Fibrous Desiccated Milk, whereof the following is a full, clear, and exact specification, such as will enable others skilled in the art to make and use the same.

This invention relates to fibrous desiccated milk; and consists in a desiccated milk of a light and fluffy or flaky consistency and composed of dried particles of a fibrous nature, said particles comprising fibrous flakes and filaments; all as more fully hereinafter set forth and as claimed.

One of the principal constituents of milk is casein; a body which belongs to the so-called fiber- or skin-forming colloids since in a dry or nearly dry state it has the power of forming tough and tenacious or coherent films or filaments. In the ordinary processes of producing desiccated milk this property is rather disadvantageous since it is apt to cause the dried masses formed on evaporation in a vacuum pan or on a rotating drum to be of rather a tough consistency, making such masses rather difficult to pulverize in the formation of milk powder. With careless work, such dried masses may even become somewhat horny. In most of the commercial desiccated milk powders the ultimate particles are, like the mass from which they are derived, comparatively dense and hard. A solid mass of dried milk when ground is converted into rounded or angular, hard, horny granules or fragments, each possessing a small surface as compared with its volume and being consequently hard to dissolve. Such fragments, moreover, tend to pack when moistened and form a hard, slowly soluble dough. In the present invention, this film or skin forming property of casein is utilized and becomes advantageous in lieu of disadvantageous, the milk to be desiccated being reduced by evaporation to the point where the contained casein will form coherent fibers on further drying, and the milk then formed into fibrous masses and dried as such. Many methods of practicing the outlined broad process may be employed. One which is easy and practicable is to transfer the thickened milk to a wire-gauze or other foraminous surface and blow through such surface and the layer of thickened milk upon it a blast of air under such conditions as will cause the air to simultaneously carry away the milk in fine threads and dry such threads. The milk may be preliminarily concentrated to the right degree upon the same foraminous surface or carrier, as is more particularly described and claimed in my Patent No. 868,447, October 15, 1907, where milk is fed upon the surface of a rotating perforated drum having air blowing outwardly through its perforations, is thickened by evaporation by such air on one portion of the drum, is then pressed down into a layer or film, is disintegrated by the air blast into a flaky filamentous or tufted mass and is finally removed as a fibrous, porous mass by detaching the base of such filamentous or tufted mass. at the point where it adheres to the drum.

An apparatus suitable for use in the described process is described and claimed in my Patent No. 868,446, October 15, 1907.

The exact nature of the filamentous or tufted mass will obviously differ with the nature of the surface of the carrier. Where the area of the imperforate portions of the surface is comparatively small and the air blast is properly adjusted, the plastic mass of milk is nearly wholly converted into a filamentous mass, the bases of the filaments tending to adhere more or less to the stated imperforate portions though having an arcuate shape corresponding to the shape of the perforations. With a slightly different structure of the perforated carrier and other conditions of air blast with a proper thickness of plastic mass, the air coming from a given orifice forces its way through the layer of milk as a bubble, leaving a vertical channel behind it. There will be such a channel corresponding to each perforation in the carrier, and the layer of milk on the carrier as a whole will have more or less of a honeycomb structure. The character of this honeycomb structure will of course depend upon the size, character and distribution of the perforations. The cap of the bubble in breaking at the surface of the layer throws a droplet of liquid outward, as is usual in bursting bubbles, but this droplet, because of the thick consistency of the milk and its tendency to form filaments, in its progress forms such a filament still attached to the layer at its base where, as is generally the case, the perforations are close set, the base of the filament will be very thin and often of bubble-like thickness. The streaming air, which is preferably heated or dried or both, of course dries to desiccation both the walls of the stated vertical channel and the filament.

In practice, I prefer to arrange the conditions so as to form the vertical channels and the filaments rather than the filaments alone as a tubular structure of at least part of the mass offers certain advantages.

In the accompanying illustration I have shown more or less diagrammatically, a process of producing the described article and the article itself.

In this showing:—Figure 1 is a vertical section of one type of apparatus capable of forming the described fibrous milk; Fig. 2 is a view of a pile of more or less comminuted milk such as is produced by the structure of Fig. 1; Fig. 3 is a top plan view of a honeycomb such as described; and Fig. 4 represents a tuft of the dried milk such as is frequently formed.

In Fig. 1, drums 1 and 2 formed, as shown of wire gauze or other foraminous material rotate together in the direction shown by the arrows, while dry air from a suitable source (not shown) is introduced in the interior of these drums and forces its way outward through the perforations therein. Milk is fed downward upon the drums from pipe 2 and accumulates as layer 3 in the trough formed by their tops. This layer is generally a mass of foam. The milk in the layer is concentrated until it becomes more or less thick and plastic, the supply of fresh milk being duly regulated. A portion of this thickened milk goes downward between the drums as a plastic layer and passes onward. The hot dry air from the interior of the drum forces its way through this layer 4, giving it a generally cellular structure. The thickness of the layer progressively increases as the layer passes onward with the drum while the desiccation becomes more and more advanced. The completely dry material is finally shaved off by scrapers 5. The milk often comes off in the form of tufts as shown in Fig. 4. The thinness of the cell walls being very great, upon handling or standing the material breaks down to form a mass of much the character of that shown in Fig. 2. In this showing, 6 may be taken to be an arcuately curved fragment of a cell wall, and 7 may be a tubular fragment. 8 may be taken as one of the described filaments, while the body of the mass consists of flakes of the fibers formed by the breaking down of the honeycomb.

The milk removed from the rotating drum under the stated preferred conditions is found to be a desiccated cellular layer looking in a way like a honeycomb, or like the "frost-flowers" seen on the earth in spring, with very thin vertical septa of the several cells, each of which cells represents a perforation of the drum while the septa represents the space between perforations. Attached to the surface of the celled layer is a sort of "pile;" a mass of velvety tufts, representing the thickened milk which the compressed air has drawn out into filaments or stringers and dried as such.

After removal from the apparatus on which it is made, the described tufted mass always disintegrates more or less because of the extreme thinness of the septa between the cells and of the fibers, and forms a flaky or fluffy mass, mainly made up of fibers, said fibers being the remnants of the septa and of the filaments. Some tubular remnants of the septa are generally present, and some of the septa walls generally form flakes; that is flattened fibrous particles. Most of the fragments of the septa however, being fragments of cells or tubes, have curved surfaces representing more or less of the original tubule. The proportions of tubular septa, of true filamentous fibers and of flaky fibers will depend upon the particular conditions under which the product was made. Under the microscope these fibrous particles, because of their thinness and translucency, have a crystalline look. It is possible that there is more or less crystallization of the milk sugar during the desiccation and that this may contribute to this appearance. The desiccated milk sugar may also aid physically in the formation of the described filamentous product.

In practice, in order to make the desiccated milk more uniform in appearance and grain, I generally break up the product somewhat by lightly grinding or similar methods and sift it, producing a mass, the ultimate particles of which are fibrous and curved, generally being relatively long as compared with their thickness and having concave surfaces adapted to contain air. Because of the fibrous character and curved surfaces of the particles, such particles tend to mat or felt together to give a mass of very light, loose structure. In use, it has the great practical advantage of not tending to form a heavy dough in mixing with water, as is the case with the ordinary granular grained milk powders. Being so light and containing so much air imprisoned between the fibers and in the hollows of the particles, it tends to float and with the great surface area of the particles this permits a rapid and ready solution. It can be readily stirred up and suspended in water and does not pack or cake down like the stated heavy granular powders. It also has the advantage of being an unusually attractive looking article in appearance because of its pure yellowish white color, its clean, crystalline and flaky or fluffy appearance and its lightness of weight. It is readily soluble in water.

Any other method of reducing a thickened plastic milk to a fibrous and filamentous condition may be employed, but that stated is simple and convenient.

What I claim is:—

1. A fibrous desiccated milk composed of thin, soluble elongated and fibrous particles of dried and coherent milk solids, such particles being of greater length than thickness and including tubular fragments, and such desiccated milk in mass being light, porous and fluffy.

2. A fibrous desiccated milk composed of a plurality of thin, soluble elongated fibrous particles of dried and coherent milk solids, said particles being of greater length than thickness and comprising flattened fibrous particles, tubular fragments and filaments.

3. A filamentous desiccated milk composed of a plurality of thin, soluble elongated particles of dried and coherent milk solids, said particles being of greater length than thickness and comprising flattened fibrous particles in honeycomb-like arrangement and filaments.

4. As a new article of manufacture, a body of dried milk comprising thin walled tubular bodies having attached filaments.

In testimony whereof I have signed this specification in the presence of two subscribing witnesses.

JOHN A. JUST.

Witnesses:
C. M. STANLEY,
C. A. SMITH.